Dec. 13, 1966      J. BLAKELEY      3,291,506
PIPE JOINTS AND THE GASKETING THEREOF
Original Filed March 23, 1959      2 Sheets-Sheet 1
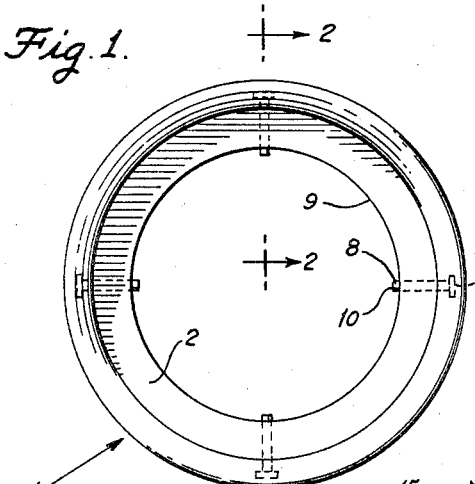
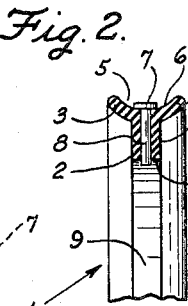
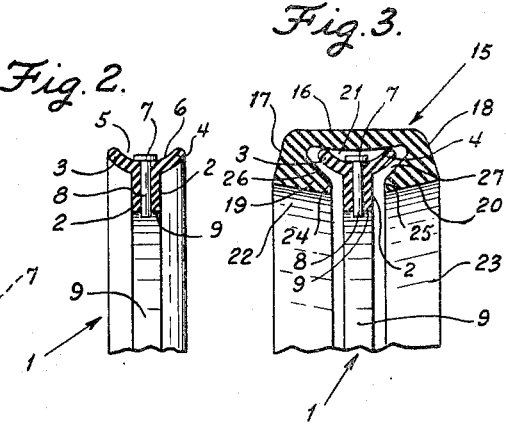
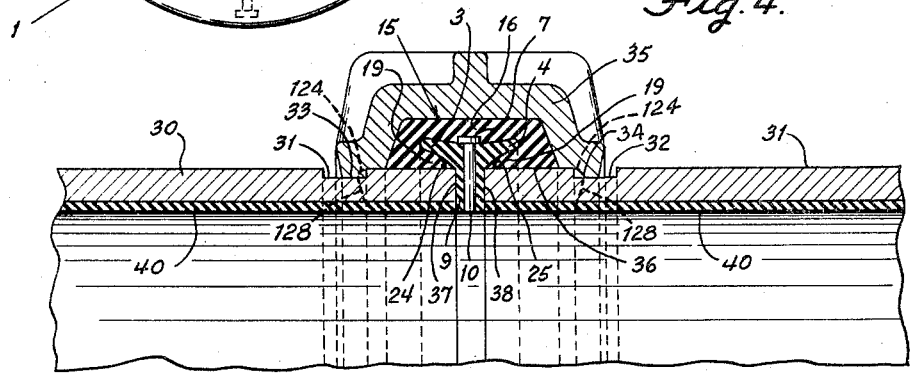
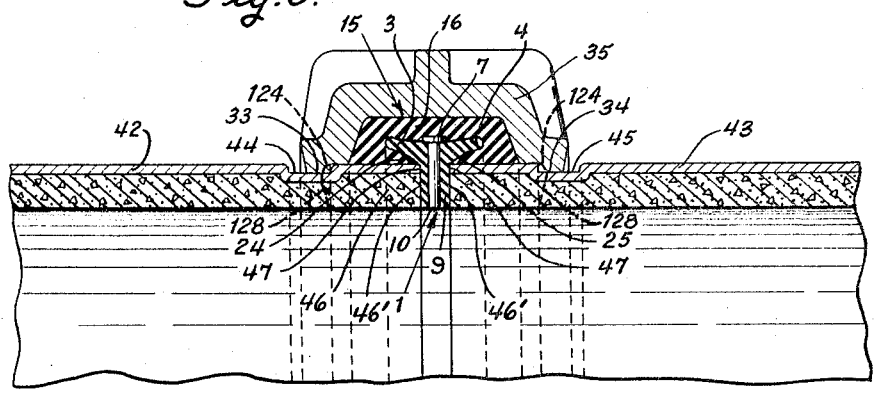
INVENTOR.
JAMES BLAKELEY
BY
*Albert M. Parker*
ATTORNEY.

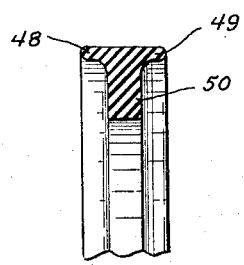
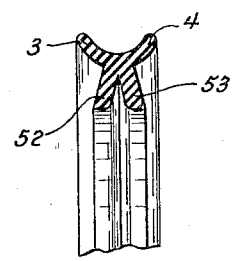
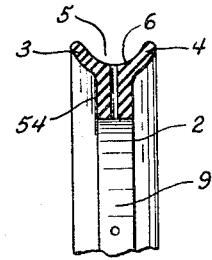
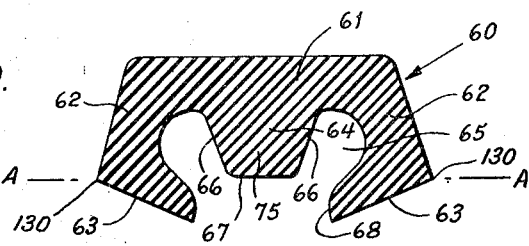
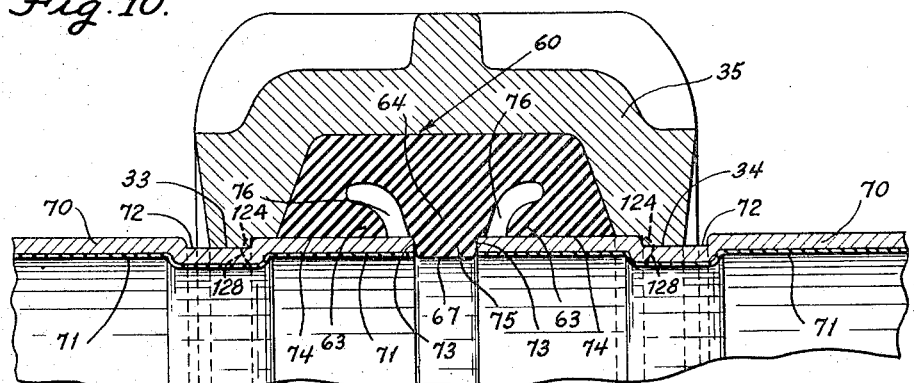
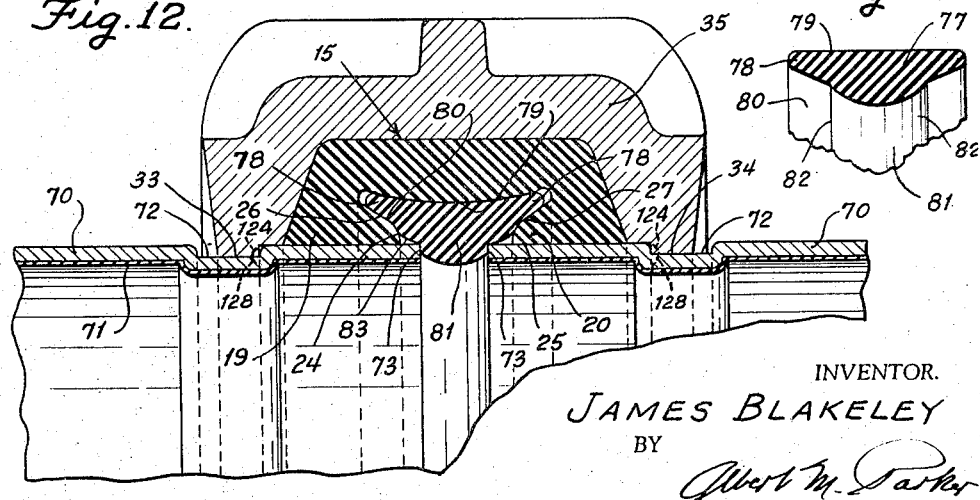
INVENTOR.
JAMES BLAKELEY United States Patent Office 3,291,506
Patented Dec. 13, 1966

3,291,506
PIPE JOINTS AND THE GASKETING THEREOF
James Blakeley, Don Mills, Ontario, Canada, assignor to Victaulic Company of America, Union, N.J., a corporation of New Jersey
Continuation of application Ser. No. 801,007, Mar. 23, 1959. This application May 18, 1965, Ser. No. 456,674
8 Claims. (Cl. 285—112)

This application is a continuation of application Ser. No. 801,007, filed March 23, 1959, now abandoned, filed as the sole invention of James Blakeley, and a continuation-in-part of application Ser. No. 177,137, filed February 27, 1962, by James Blakeley and Harry M. Sweet, now abandoned.

This invention relates to the coupling of sections of pipe by the use of coupling housings engaging grooves in the pipe and is particularly concerned with improvements in the gaskets employed for sealing the joint between the pipe ends.

In the coupling of sections of pipe employing coupling housings bridging the gap between the pipe ends, which housings engage grooves in the pipe exteriors and contain pressure-responsive gaskets bridging the gap, the pressure of the fluid in the pipe is effective to assist in sealing the joint. In order that it may do so it is common to employ gaskets of C-shape in cross section and to couple the pipes with the ends thereof spaced a small distance apart providing for flexibility in the joint, thus leaving a path between the interior of the pipes and the interior of the gasket for transmission of the pressure to the gasket. For certain piping services, however, of which the chemical, food, paper and mining industries are examples, it is undesirable to allow the product flowing through the pipe to gather in the hollow of the gasket, commonly referred to as the "well." Also, there are situations where uninterrupted flow of the product through the pipe is desired which situations may be the same as or different from those calling for the elimination of the well. Where such uninterrupted flow is a factor it is necessary to fill any recess which exists between the pipe ends.

Another factor that sometimes has to be taken into consideration is that the piping may be lined with a brittle material such as cement which needs to be protected from coming together during assembly or flexure of the joint so as to avoid chipping pieces off of it. From another standpoint it is sometimes necessary, where a metal pipe is lined with material such as an anticorrosive, to prevent the contents of the pipe from getting at the metal of the pipe where it is exposed at the joints.

The meeting of the foregoing needs and the introduction of other advantages into coupling of grooved end pipe by coupling housings clamped thereover are taken care of by the construction of the instant invention. In the first place, the invention provides a solution by the inclusion of separate members within, or by the slight modification of, existing pressure responsive gaskets without the necessity of making any changes in pipe preparation and while employing coupling housings which are readily available. It does so by the application of members to standard gaskets which not only serve to close off the gasket cavity and thus prevent flow of fluids thereinto, or cavitation, as it is called in the trade, while at the same time providing for a filler piece for protecting the pipe ends, the linings thereof, and the metal in back of the lining, as desired. At the same time the gasket improvements of the invention assist in effecting joints between pipe ends, since in their positioning of the pipe ends a distance apart they resiliently serve to take up variations from the standard. In other words, they compensate for deviations from squareness of pipe ends and, in the "A" dimension, the distance between the pipe end and groove.

It is, accordingly, an object of the invention to improve on the gaskets embodied in the coupling of grooved end pipe by means of clamping type coupling housings.

Another object is to prevent materials flowing through the pipe from getting into the cavity of the gaskets.

Still another object is to provide uninterrupted flow through pipes so coupled although normal pipe ends be spaced somewhat apart.

Still another object is to impart a certain amount of rigidity to the joint by reducing the amount of deflection of the pipe ends.

A further object is to act as a shock absorber and to thus protect the linings of pipe from end fracture in the coupling of the pipe sections.

A further object is to reduce the gasket surface area exposed to attack by the line product.

A further object is to form a seal between ends of the sections of lined pipe coupled together so that the fluid within the pipe cannot come in contact with the metal of the pipe in back of the lining.

A still further object is to provide for the use of less expensive standard gaskets by providing for small gasket inserts of highly chemically resistant, more expensive material.

Still further objects are to accomplish the foregoing without any change in existing coupling practice with the exception of the inclusion of additional parts within, or the addition of simple parts to, standard gaskets.

Further and more detailed objects of the invention will in part be obvious and in part be pointed out as the description of the invention taken in conjunction with the accompanying drawing proceeds.

In that drawing:

FIG. 1 is an elevation of a gasket insert in accordance with the presently preferred form of the invention.

FIG. 2 is a fragmentary section taken on line 2—2 of FIG. 1 and looking in the direction of the arrows.

FIG. 3 is a view similar to FIG. 2 showing the insert as encompassed by a C-cross section gasket.

FIG. 4 is a fragmentary section through a pipe joint in accordance with the invention showing the application of the invention to standard weight pipe with a thin lining.

FIG. 5 is a similar view showing the application thereof to a thin wall pipe with a thick lining.

FIGS. 6, 7, and 8 are views similar to FIG. 2 of modified forms of inserts.

FIG. 9 is a transverse section of a modified gasket with an integral insert.

FIG. 10 is a view similar to FIG. 5, somewhat enlarged, ut showing the gasket of FIG. 9 in place within the coupling housings.

FIG. 11 is a section similar to FIG. 2 of a further modified form of insert; and FIG. 12 is a view similar to FIG. 5, somewhat enlarged, employing the FIG. 11 insert in place of that of FIG. 5.

In the embodiment of the invention illustrated in FIGS. 1–5, the gasket insert, generally shown at 1 in FIG. 1, is an annulus of roughly Y shape in cross section. The leg of the Y forms the body of the insert and forms the radially inward ring portion 2 The outer periphery of the portion 2 spreads into a shallow U form in cross section diverging into rim portions 3 and 4 which border and form the shallow groove 5 having a surface 6. This, then, is the form of the insert 1 in relaxed condition.

The insert 1 would normally be formed of the same type of elastomeric material as that of the gasket receiving it. For use where oil, gasoline or other petroleum products are transported through the pipe a compound having a synthetic rubber base is necessary, while for water, air, dilute acids and general service a gasket of a vulcanized rubber base compound is recommended. Furthermore, the insert should be of appropriate resiliency for meeting the various conditions of this service, as will appear hereinafter. Again, resiliency comparable to that of the gasket has been found to be effective. The desired resiliency provided by the material indicated has been found to be present when the materials had a durometer hardness within the range of 50–70. It presently appears that the best results are achieved with a hardness approximately in the middle of that range.

The insert 1 is also shown as having a plurality, here illustrated as four, radial pins seated within it. These are actually commercially available stainless steel rivets. Their heads 7 lie on the surface 6 of the insert and their shanks 8 extend through the ring portion 2. Preferably the shanks 8 take up the major portion of the thickness of the ring portion 2 so that, for example, when with a ring portion 2 having a thickness of 3/16" the diameter of the pin shank would be 1/8". Also, as seen in FIGS. 1–3, when the insert 1 is in its relaxed state the shanks 8 of the pins extend a short distance radially inwardly of the inner surface 9 of the ring 2. The purpose of these pins is to prevent the shearing off of the ring portions 2, or parts thereof, by the pipe ends, as will be explained more fully hereinafter.

For the application of the pins to inserts 1 suitable holes are formed through the inserts. These are preferably slightly smaller than the diameter of the pin shanks so that the pins will have to be forced therethrough. Accordingly, the material of the insert will hug the pin shank 8 and preclude any leakage therealong. Alternatively, instead of employing pins having squared off ends 10 as shown, it would in some instances be possible to use pins having pointed ends and to force the pins through the material without any holes having been provided therefor.

The application of the insert 1 to a pressure responsive C-shaped gasket 15 where both are in relaxed form is shown in FIG. 3. The gasket 15 has a base portion 16 bordered by side portions 17 and 18 which terminate in inwardly extending lip portions 19 and 20. These parts define a cavity 21 which normally receives the fluid, under pressure, flowing through the pipe. The gasket 15 being of suitable resilient rubber-like or plastic material as previously pointed out, its lips 19 and 20 will seat their radially inwardly faced surfaces 22 and 23 on the appropriate surfaces of the pipes to be coupled, as seen in FIGS. 4 and 5.

In the relaxed state, as seen in FIG. 3, the bodies of the lips 19 and 20 and particularly their inner surfaces 22 and 23 will be seen to be inclined at a small angle radially inwardly with respect to the axis of the gasket. Such being the case, the cavity 21 is of a size to enable the rim portions 3 and 4 of the insert 1 to be readily seated therein, since those rim portions are thin and resilient enough to be easily pushed towards each other so that the insert can be introduced through the slot bordered by the ends 24 and 25 of the lips. This slot will be seen to be somewhat wider than the width of the ring portion 2. Furthermore, it will be seen from the FIG. 3 showing that the inner surfaces 26 and 27 of the lips 19 and 20 are rather sharply inclined radially inwardly toward the axis of the gasket. These inclined surfaces cooperate with the under surface of the insert rim portions 3 and 4 to center the insert with respect to the gasket and to cause the ring portion 2 to extend radially inwardly the same distance all around the periphery thereof. This is important in order that the concentricity of the radially inwardly protruding part of the ring 2 with respect to the bore of the pipe will be insured.

Turning now to FIG. 4, two sections of pipe 30 and 31 are shown as coupled together with coupling housings equipped with a gasket and insert in accordance with the invention. The sections of pipe, 30 and 31, are shown as being of standard thickness so that there is sufficient material for the cutting of grooves 31 and 32 therein for the reception of the key sections 33 and 34 of the coupling housing 35. The coupling housing as here shown is of the type where generally two, but sometimes more than two, segments are bolted, or otherwise clamped, together to form a circle overlying the pipe and providing annular key sections 33 and 34 seating in the pipe grooves 31 and 32. Here the coupling housings preferably have their key sections formed with lead in portions as shown and described in Patent No. 3,054,629, of Edward W. Piatek, which is owned by applicant's assignee. Thus as shown in each of FIGS. 4, 5, 10, and 12, the ends of the key sections of the coupling parts are chamfered at 124, 128, whereby to form inclined portions at the ends of the key sections of the segments of the housing. The purpose of using such coupling housings is to take advantage of the inclined portions formed at the ends of the key sections of the segments in order to draw the pipe ends towards each other as the housing segments are applied to the pipe. Though the use of such particular coupling housings is preferable, it is not essential, since other means, such as, for instance, pipe jacks, may be employed for drawing the pipe ends towards each other.

Assuming then that the gasket, generally indicated at 15, carrying the insert 1 is applied to the pipe surfaces 36, whose longitudinal extent is that of the "A" dimension previously referred to, it will be seen that the lips 19 and 20 are deflected radially outwardly by the surfaces 36 as they are slid onto the same; the common practice being to seat one side of the gasket on one pipe end and then introduce the other pipe end into it. In this instance, however, the effect of deflecting the lips radially outwardly is to somewhat close up the cavity 21 with the result that it is almost completely filled by the outer periphery of the insert 1 provided by the rims 3 and 4. There is insufficient space left above the insert for the heads 7 of the pins so that they seat themselves into the body portion 16 of the gasket.

At the same time, it will be seen that the ring portion 2 of the insert is approached by the inner ends 24 and 25 of the gasket lips, but it is preferable to avoid the making of tight joints here. Finally, and most importantly, it is to be noted that the ends 37 and 38 of the pipes have engaged the radial faces of the ring 2 and have compressed the same somewhat so as to form a substantially tight seal thereabout. This is due to the fact that the thickness of the ring portion 2 is made slightly greater than the greatest gap that will exist between the ends 37 and 38 when the grooves 31 and 32 are formed at the standard positions from the pipe ends and the key sections 33 and 34 of the coupling housings are the standard distance apart. For 4" pipe the greatest standard gap would be 1/4", thus the width of the section 2 would need to be a little greater than this and, of course, the diameter of the pin shanks 8 would need to be somewhat less so that there will always be resilient material between the pins and the pipe ends.

It is also to be noted that the sections of pipe 30 and 31 are here shown as provided with thin lining 40, which would be of suitable material to resist action of the contents of the pipe. It is further to be noted that the inner face 9 of the ring portion 2 is substantially flush with the inner surface of the lining 40. This is the preferable condition, since it assures uninterrupted flow of the fluid through the pipe.

Returning to the application of the coupling housings, they themselves, if of the form shown in the Piatek Patent No. 3,054,629, will cause the pipe ends to be drawn towards each other as the gap between the coupling segments is reduced by the tightening of the clamping bolts. Otherwise the pipe sections will be drawn together with a pipe jack so that coupling housings devoid of the improvements of the Piatek application can be seated with their key sections in the grooves 31 and 32. This drawing together is necessary, since the ring portions 2 are a little wider than the largest gap permissible between the pipe ends and since it is desired to form a tight seal between those ends, not only protecting them against contact with the fluid within the pipe but also preventing ingress of fluid from the pipe into the cavity of the gasket 16 should any still exist and, at the same time, eliminating any interruption in the path along the pipe interior such as would be likely to disturb the flow. It would also be apparent that as the pipe ends are drawn together the ring portion 2 of the insert will be squeezed and being resilient it will seek to flow where it can. Thus if any cavity remains within the gasket 16 that would be filled while otherwise the ring portion will flow radially inwardly bringing its inner surface 9 into alignment with the interior of the lining 40 so long as the parts are properly proportioned. At the same time, the radial elongation of the ring portion 2 will be substantially the same as the extending portion of the pin shank 8 so the end 10 of the pin should lie substantially flush with the inner face 9 of the ring portion 2.

The combination just described achieves all of the objects of the invention but does so in a simple straightforward manner and, what is important to the industry, enables it to be done without the necessity of adding any special inventory beyond that which they normally carry, with the exception of the insert 1 itself. Preferably the gaskets 15 are standard and the coupling housings 35 are either of the earlier standard form or of the commercially available form as disclosed in the Piatek Patent No. 3,054,629.

The insert 1 itself is intended to form a tight seal between the pipe ends. It is also intended to maintain that seal though there be a certain amount of axial movement of the pipe sections due to expansion or contraction, or other movement resulting in deflection of one section with respect to the other. It is in respect of either of these pipe movement that the stainless steel pins 7, 8 become effective. Without them and particularly in an instance where substantial deflection takes place, so that the pipes would be at somewhat of an angle to each other, the possibility exists that the metal ends 37 and 38 might shear off part of the ring portion 2, or, in any event, so damage it that either then, or when the pipes move to another position, the seal would be broken. With the pins present, however, they being of hard stainless steel and their effect being felt as soon as moderate deflection or contraction takes place, the insert is protected, since the pin, rather than the insert, acts to resist the damaging action.

It will also be apparent that the resiliency of the ring portion 2 when the pipe ends are brought together and at other times will protect the lining 40 from being broken or chipped. Also the presence of the compressed material of the ring imparts rigidity to the joint, which would not be realized if the insert were lacking. Finally, should the insert fail in any way to make a tight seal, the gasket 15 would stand in back of it to prevent leakage. This is so, because as initially applied to the pipes the gasket makes a tight seal and that seal is enhanced whenever pressure builds up in its cavity to force the lips 19 and 20 down against the surfaces 36.

In FIG. 5 the gasket, insert, and coupling assembly of FIGS. 1–4 are shown as applied to a somewhat different form of pipe. Insofar as the assembly is concerned, the parts are the same so are given the same reference characters. The pipe here, however, is more correctly characterized as "tubing," as seen by the thin wall of its sections 42 and 43. Furthermore, these have grooves 44 and 45 rolled therein for reception of the key sections 33 and 34 of the coupling housing. Tubing sections 42 and 43 are here shown as lined with a materially thicker lining than that of the FIG. 4 showing, it being illustrated as being of cement, 46. In this instance the cushioning effect of the insert 1 between the ends 46′ of the cement lining is of particular significance, since such a lining is more likely to chip or be broken off than would be a thin rubber or plastic lining, as illustrated in FIG. 4. Here the ends 47 of the tubing are sealed off by the ring portion 2 of the insert. The sealing effected by the squeezing of the portion 2 is of particular significance here, for the possibility exists of surface imperfections at the ends of the concrete liner which might result in forming a leakage path save for the flow of the material of the insert thereinto as the part 2 is squeezed.

At this point it is to be noted that though the insert 1 and the gasket 15 may commonly be made of the same material, their relationship may be varied as required by the particular service to which the parts are subjected. In particular, if a more chemically resistant material is needed in contact with the fluid within the pipe, the insert can be made of such material while the gasket need not be, since the likelihood of the gasket being engaged by such material is remote. The insert is of considerably smaller volume than the gasket so a saving can be effected by the making of the insert of highly resistant material while providing standard, or even less expensive gaskets for backing up the insert.

The gasket shown in FIG. 6 merely differs from that of the previous showings in that its cross section is of a T rather than of a Y. Thus its rim portions 48 and 49 extend out at right angles with respect to the ring portion 50. Since it is made of elastomeric material of adequate resilience, however, it can be seated within the gasket such as 15 and will accommodate itself to the joint, the same as the insert 1.

The insert of FIG. 7 differs from that of FIGS. 1–5 merely in that the ring portion 2 is split into two portions 52 and 53. This facilitates the bringing together of the pipe ends in the assembly of the coupling, since less compression is needed. However, the parts 52 and 53 are, of course, tightly engaged and compressed in the final securing action, so that the end result is the same.

The insert of FIG. 8 is the same as that of FIGS. 1–5, and so carries the same reference characters. Additionally, however, its ring portion 2 has small holes 54 formed therethrough to provide communication between the surface 9 and the groove 5 through the surface 6. These holes permit the exhaust of any air trapped in the groove 6 as the insert is seated in the gasket 15 and compressed when positioned therein. The holes are small enough, however, that on completion of the compression they are closed up and, in any event, their upper ends will engage against the inner surface of the gasket portion 16 so no leakage path would exist.

It is, of course, understood that any of the inserts 6–8 may be formed of elastomeric material of the same or different resilience or composition with respect to the material of the gasket 15. Also, they may be equipped with pins as shown in the insert 1, if desired.

Two further modifications of the invention are illustrated in FIGS. 9 and 10 and in FIGS. 11 and 12. These have particular applicability to thin wall pipe or tubing, whether unlined or provided with a thin lining. The gasket of FIG. 9, generally indicated at 60, is made of elastomeric material, as indicated, and has a base portion 61, side portions 62, and lip portions 63 of generally the same configuration and extent as the gasket shown in FIGS. 1–5. Instead of a separate insert, however, this gasket is provided with a central integral tongue 64 which extends downwardly from the base portion 61 into the gasket cavity dividing the same into two portions 65. The tongue 64 is, of course, annular, the same as the gasket, and centered with regard to its center line. Preferably it has radially outwardly inclining sides 66 and in relaxed state its inner surface 67 lies radially outwardly with respect to the ends 68 of the lips 63. The taper of the sides 66 is such that where they approach the surface 67 the distance between them is slightly greater than the greatest gap allowed between the pipe ends when the joint is completed following regular standards for the "A" dimensions and the coupling housing.

The manner in which the gasket of FIG. 9 accommodates itself to close and seal the joint between the pipe ends is illustrated in FIG. 10. Here two sections of thin walled pipe or tubing 70, which may or may not be lined with a thin liner 71 as desired, are coupled together by means of a coupling housing in all respects similar to the coupling housing 35 previously described and accordingly identified by the same reference characters. Thus the key sections 33 and 34 of the housing 35 are seated within the grooves 72 rolled in the exterior of the pipes at the standard distances from the pipe end 73 and, accordingly, providing the standard surfaces 74 for engagement by the gasket. Here, again, once the gasket is seated on the pipe ends its lips 63 will be swung radially outwardly about the portions 62 to lie flat on the surfaces 74. In this instance the nose 75 of the tongue 64 will have been projected between the pipe end 73 into contact with the end edge faces thereof. The nose portion 75 of the tongue 64 again serves as a buffer and a protection for the ends of the pipes, seals them against contact by the fluid within the pipe and also effects a seal against fluid getting up into the remaining portions 76 of the cavities 65. Furthermore, should the pipe be lined as here indicated, the tongue 64 would be of sufficient extent that its nose portion would extend down in opposition to the lining.

The change of radial position of the inner end of the annular rib 64 relative to the lip portions of the gasket when the relaxed gasket shown in FIG. 9 is mounted in operative position in a coupling housing to join pipe sections 70 takes place as follows: In the relaxed gasket, the radially inner end of the annular rib portion 64 extends radially inwardly at least substantially to the imaginary circular cylinder coaxial of the base portion of the gasket which intersects and contains the circles (that is, on which such circles lie) on the opposite ends of the gasket at the respective intersection 130 between the respective axially outer side surfaces of the portions 62 of the gasket and the radially inner surfaces 63 of the lip portions of the gasket. A dash line A—A in FIG. 9, which passes through points 130, represents a geometrical element of such imaginary cylinder.

A part of the change of shape of the gasket from that of FIG. 9 to that of FIG. 10 is caused by the above-described upward swinging of the lip portions of the gasket by the pipe ends. Another part is contributed by the radial compression of the gasket by the coupling housing as the parts of the housing are drawn together. Such radial compression is readily apparent upon comparing the gasket in its relaxed condition (FIG. 9) with that in its compressed condition (FIG. 10). The end portions 62 of the gasket body, being radially compressed between the pipe ends 70 and the annular radially outer wall of the housing cavity, are appreciably reduced in radial height. The radially inner end of the axially central part of the annular rib, however, is not directly engaged by anything acting as a compressing abutment, the end of the pipe sections engaging only the side edges of such rib, axially outwardly of such central part of the rib. As a consequence, the annular rib is compressed radially to a much less degree than the axially outer end portions of the gasket. Such combination of effects, the upward swinging of the lip portions of the gasket, and the substantially greater radial compression of the axially outer end portions of the gasket than that of the annular central rib, causes the gasket of FIG. 9 when operatively mounted to assume the shape shown in FIG. 10.

In this instance, as distinguished from previous ones, the cavity in the gasket is not completely filled. Instead it is divided into two cavities of considerably reduced volume. Nevertheless these are capable of receiving pressure should the seal provided between the pipe ends by the nose 75 fail to hold. Accordingly, the secondary sealing effect of the lips 63 would come into play and prevent leakage. Here the nose portion 75 actually acts more like a gap filler than a seal. The type of seal formed by it will be relatively weak allowing leakage at relatively low pressure. However, the gasket 60 will confine that leakage.

The joining of thin walled pipe in many respects similar to that of FIG. 10, is illustrated in FIG. 12 as being effected by a further modified gasket and insert construction. Likewise the coupling housing is of the same construction as that of the previous forms, so the parts thereof are given the same reference characters. Additionally, the gasket 15 is the same as that of FIGS. 1–5. The one different element is the particular insert, here shown as of a strip type illustrated per se at 77 in FIG. 11. This, of course, is an annulus which in its relaxed form is shaped generally as illustrated in FIG. 11. Its body is a straight transverse portion with rounded ends 78, a flat top 79, radially inwardly inclined side sections 80 and a radially inwardly projecting center rib 81. The rib 81, symmetrical with respect to the transverse center line of the gasket, is rounded radially inwardly so as to project abruptly away from the side sections 80, departing therefrom along the lines 82. This insert when seated within the gasket 15 centers itself with respect thereto by means of its inclined surfaces 80 engaging the surfaces 26 and 27 of the lips 19 and 20. Accordingly, the rib portion 81 extends into the gap between the pipe ends 73 and forms a seal around the periphery of the joint at each of the pipe ends. The curvature and extent of the rib 81 controls whether or not the insert 77 seals off the end faces 73 of the pipe from contact with the pipe contents, or goes further and overlies the end of the lining. Even though in some forms of this insert the end faces of the pipes may not be fully covered by the insert, it will still form a strong buffer against the pipe ends and/or the lining being damaged during assembly of the coupling by deflection, expansion, or contraction of the pipe sections. In fact, the formation of this insert is such that the likelihood of shearing of, or injury to it, by movement of the pipe sections is less than would be the case with regard to the inserts previously described.

Another thing to be noted here is that the insert does not necessarily completly fill the gasket cavity leaving small pockets 82 at each end and at 83 opposite the ends of the lips at 24 and 25. These merely serve to enhance the effectiveness of the gasket should any fluid under pressure leak past the rib 81. This form of insert is, accordingly, a simple and economical one when the joining of thin wall pipe is being effected. It performs substantially as effectively as the previous inserts, particularly with regard to the prevention of cavitation, and it may, of course, be made of a variety of materials as set forth in the foregoing description of insert 1.

Though in the foregoing description and accompanying drawing a preferred and several modified forms of the invention have been shown and described, it is, of course, to be understood that this showing and description is for illustrative and not limiting purposes. One skilled in the art might well device further variations and modifications of the structures and assemblies embodied in the examples given without departing from the spirit and scope of the invention.

It is thus to be understood that the intention with regard to all matter contained in the above description or shown in the accompanying drawing is that it shall be interpreted as illustrative and not in a limiting sense.

Having described my invention, what I claim as new and desire to secure by Letters Patent is:

1. A pipe joint comprising a pair of sections of grooved end pipe positioned for coupling, an annular coupling housing overlying portions of said sections of pipe adjacent the ends thereof, said housing bridging the ends of said pipe sections and carrying radially inwardly extending annular key members engaged with the groove in said sections of pipe to hold said sections of pipe together, said coupling housing being formed with an interior annular channel, said channel being in overlying relationship with respect to said pipe ends and the portions of said pipe between said grooves and said ends, a continuous annular resilient gasket within said channel, said gasket having a base portion, radially inwardly extending side portions extending from the opposite sides of said base portion and lip portions extending towards each other from the radially innermost portions of said side portions, said base portion, side portions, and lip portions of the gasket defining an integral body which is C-shaped in transverse section, said lip portions terminating in spaced apart ends and said lip portions having the inner surfaces thereof engaged with the surfaces of said pipes within said coupling housings, an elastomeric annular member carried by said gasket and extending radially inwardly from the base portion of the gasket between the side portions and lip portions thereof, the radially inner edge portion of the annular member lying between the end surfaces of said pipe sections, the end surfaces of said pipe sections extending into compressive engagement with the respective end surfaces of the annular member so as to deform the annular member and form seals therewith.

2. A pipe joint as in claim 1, said annular member being made as an insert separate from said gasket.

3. A pipe joint as in claim 1 and including, said coupling housing being formed of a plurality of annular sections secured together to form a complete annulus, said annular key sections having the inner side surfaces thereof formed with surface portions inclined outwardly with respect to said inner surfaces whereby said inclined surface portions will first engage the inner side walls of the grooves in said pipe ends and will draw said pipe ends toward each other and will compress said terminal portion of said insert as said annular sections of said housing are brought together.

4. A pipe joint comprising a pair of sections of grooved end pipe positioned for coupling, an annular coupling housing overlying portions of said sections of pipe adjacent the ends thereof, said housing bridging the ends of said pipe sections and carrying radially inwardly extending annular key members engaged with the groove in said sections of pipe to hold said sections of pipe together, said coupling housing being formed with an interior annular channel, said channel being in overlying relationship with respect to said pipe ends and the portions of said pipe between said grooves and said ends, a continuous annular resilient gasket within said channel, said gasket having a base portion, radially inwardly extending side portions extending from the opposite sides of said base portion and lip portions extending towards each other from the radially innermost portions of said side portions, said base portion, side portions, and lip portions of the gasket defining an integral body which is C-shaped in transverse section, said lip portions terminating in spaced apart ends and said lip portions having the inner surfaces thereof engaged with the surfaces of said pipes within said coupling housings, a resilient annular member carried by said gasket and extending radially inwardly from the base portion of the gasket between the side portions and lip portions thereof, the radially inner edge portion of the annular member lying between the end surfaces of said pipe sections, said resilient annular member being formed integrally with said gasket and extending radially inwardly from the inner surface of said base portion, the portion of said annular member where the same emerges radially outwardly from the gap between said pipe ends flowing axially over onto the outer surface of said pipe sections to seal against the same and the sides of said annular member opposite said lip portions being substantially spaced throughout from the opposed surface of said lip portions to retain substantial cavities within said gasket channel at either side of said annular member.

5. A pipe joint comprising a pair of sections of grooved end pipe positioned for coupling, an annular coupling housing overlying portions of said sections of pipe adjacent the ends thereof, said housing bridging the ends of said pipe sections and carrying radially inwardly extending annular key members engaged with the groove in said sections of pipe to hold said sections of pipe together, said coupling housing being formed with an interior annular channel, said channel being in overlying relationship with respect to said pipe ends and the portions of said pipe between said grooves and said ends, a continuous annular resilient gasket within said channel, the main body of said gasket having a base portion, radially inwardly extending side portions extending from the opposite sides of said base portion and lip portions extending towards each other from the radially innermost portions of said side portions, said base portion, side portions, and lip portions of the main body of the gasket defining an integral body which is C-shaped in transverse section and has an annular cavity therewithin, said lip portions terminating in spaced apart ends and said lip portions having the inner surfaces thereof engaged with the surfaces of said pipes within said coupling housings, an elastomeric annular member carried by and separate from said main body of the gasket and extending radially inwardly from the base portion of the main body of the gasket between the side portions and lip portions thereof, the radially inner edge portion of the annular member lying between the end surfaces of said pipe sections, the end surfaces of said pipe sections extending into compressive engagement with the respective end surfaces of the annular member so as to deform the annular member and form seals therewith, the annular member being a part of an insert for the main body of the gasket, said insert comprising a body portion in the form of a ring seated within the cavity in the main body of the gasket, said annular member carried by the main body of the gasket being an axially intermediate portion of the insert extending radially inwardly from the body portion thereof, the radially inner face of said intermediate portion of the insert being transversely rounded and said body portion of the insert including rib portions extending laterally from and with respect to said intermediate portion at either side thereof and inclining away from the same, said intermediate portion forming only a minor fraction of the total width of said insert.

6. A pipe joint comprising a pair of sections of grooved end pipe positioned for coupling, an annular coupling housing overlying portions of said sections of pipe adjacent the ends thereof, said housing bridging the ends of said pipe sections and carrying radially inwardly extending annular key members engaged with the groove in said sections of pipe to hold said sections of pipe together, said coupling housing being formed with an interior annular channel, said channel being in overlying relationship with respect to said pipe ends and the portions of said pipe between said grooves and said ends, a continuous annular resilient gasket within said channel, the main body of said gasket having a base portion, radially inwardly extending side portions extending from the opposite sides of said base portion and lip portions extending towards each other from the radially innermost portions of said side portions, said base portion, side portions, and lip portions of the main body of the gasket defining an integral body which is C-shaped in transverse section and has an annular cavity therewithin, said lip portions terminating in spaced apart ends and said lip portions having the inner surfaces thereof engaged with the surfaces of said pipes with said coupling housings, an elastomeric annular member carried by and separate from said main body of the gasket and extending radially inwardly from the base portion of the main body of the gasket between the side portions and lip portions thereof, the radially inner edge portion of the annular member lying between the end surfaces of said pipe sections, the end surfaces of said pipe sections extending into compressive engagement with the respective end surfaces of the annular member so as to deform the annular member and form seals therewith, the annular member being a part of an insert for the main body of the gasket, said insert comprising a generally parallel sided ring formed of relatively soft resilient material, said ring constituting said annular member carried by the main body of the gasket, said ring having greater radial than axial extent, substantially axially extending opposite rib portions formed integrally with said ring and projecting outwardly from the radially outermost portion of said ring at the opposite sides thereof, the radially outer portion of the insert including said rib portions and the radially outer part of said ring being seated within the cavity in the main body of the gasket, radially extending hard metal pin-like members having shanks seated in said ring and having heads seated on the radial outermost surface of said ring between said rib portions, the diameter of said shanks being slightly less than the axial width of said ring and there being three of said pin-like members evenly spaced about the circumference of said insert.

7. In gasket construction for the coupling of grooved end pipe, a continuous annular gasket member formed of elastomeric material and of E shape when viewed in transverse section, said gasket having a base portion, radially inwardly extending side portions extending from the sides of said base portion, lip portions extending toward each other from the radially inner portion of said side portions, said lip portions terminating in spaced apart faces and an annular rib portion extending radially inwardly from said base portion, the sides of said rib portion being spaced from said side portions and from said lip portions thereby providing annular cavities within said gasket at either side of said rib portion, said lip portions when said gasket is in relaxed position being inclined inwardly toward the axis of the annulus of said gasket, and said lip portions, when said gasket is in compressed condition, being swung upwardly about said inner portions of said side portions and lying in a cylindrical zone concentric with respect to the axis of said gasket, with said rib portion extending radially inwardly between and beyond the inner ends of said lip portions and said gasket cavities being materially reduced in volume, said rib portion when said gasket is in relaxed position terminating at a position spaced radially outwardly with respect to the inner ends of said lip portions and extending radially inwardly at least substantially to the imaginary circular cylinder coaxial of the base portion of the gasket which intersects and contains the circles on the opposite ends of the gasket at the intersection between the respective axially outer side surfaces of the gasket and the radially inner surfaces of the lip portions, said rib portion having opposite annular end surfaces adapted to form continuous seals with the end surfaces of pipe sections received within the gasket.

8. In gasket construction for the coupling of grooved end pipe, a continuous annular gasket member formed of elastomeric material and of E shape when viewed in transverse section, said gasket having a base portion, radially inwardly extending side portions extending from the sides of said base portion, lip portions extending toward each other from the radially inner portion of said side portions, said lip portions terminating in spaced apart faces and an integral annular rib portion extending radially inwardly from said base portion, said rib portion being of uniform section circumferentially thereof and having opposite continuous annular end surfaces adapted to be abutted by and form seals with the ends of pipe sections received within the gasket, the sides of said rib portion being spaced from said side portions and from said lip portions thereby providing annular cavities within said gasket at either side of said rib portion, said lip portions when said gasket is in relaxed position being inclined inwardly toward the axis of the annulus of said gasket, and said lip portions, when said gasket is in compressed condition, being swung upwardly about said inner portions of said side portions and lying in a cylindrical zone concentric with respect to the axis of said gasket, with said rib portion extending radially inwardly between and beyond the inner ends of said lip portions and said gasket cavities being materially reduced in volume, said rib portion when said gasket is in relaxed position terminating at a position spaced radially outwardly with respect to the inner ends of said lip portions, and extending radially inwardly at least substantially to the imaginary circular cylinder coaxial of the base portion of the gasket which intersects and contains the circles on the opposite ends of the gasket at the intersection between the respective axially outer side surfaces of the gasket and the radially inner surfaces of the lip portions.

References Cited by the Examiner

UNITED STATES PATENTS

| | | | |
|---|---|---|---|
| 1,541,601 | 6/1925 | Tribe | 285—112 |
| 1,704,003 | 3/1929 | Johnson | 285—108 |
| 1,857,297 | 5/1932 | Faulkner | 285—367 |
| 2,184,376 | 12/1939 | Beyer | 285—383 |
| 2,249,848 | 7/1941 | O'Brien | 285—112 |
| 2,424,542 | 7/1947 | Adams | 285—373 |
| 2,449,795 | 9/1948 | Stillwagon | 285—112 |
| 3,006,663 | 10/1961 | Bowne | 285—232 |
| 3,054,629 | 9/1962 | Piatek | 285—373 |

FOREIGN PATENTS

| | | |
|---|---|---|
| 861,123 | 10/1939 | France. |
| 925,743 | 3/1955 | Germany. |
| 1,027,020 | 3/1958 | Germany. |
| 190,318 | 12/1922 | Great Britain. |
| 708,521 | 5/1954 | Great Britain. |
| 363,558 | 10/1938 | Italy. |
| 543,404 | 5/1956 | Italy. |

THOMAS F. CALLAGHAN, *Primary Examiner.*

R. G. GIANGIORGI, *Assistant Examiner.*